United States Patent [19]

Nomura et al.

[11] Patent Number: 5,054,860
[45] Date of Patent: Oct. 8, 1991

[54] HYDRAULIC BRAKING SYSTEM FOR AN AUTOMOTIVE VEHICLE

[75] Inventors: Yoshihisa Nomura; Masahiko Kato; Michiharu Nishii, all of Toyota, Japan

[73] Assignee: Aisin Seiki Kabushiki Kaisha, Kariya, Japan

[21] Appl. No.: 474,333

[22] Filed: Feb. 2, 1990

[30] Foreign Application Priority Data

Feb. 4, 1989 [JP] Japan ................................ 1-12376[U]

[51] Int. Cl.$^5$ .............................................. B60T 8/32
[52] U.S. Cl. .................................... 303/92; 188/358; 303/114; 303/119
[58] Field of Search .............. 303/92, 114, 119, 110, 303/100; 188/181, 358; 60/545

[56] References Cited

U.S. PATENT DOCUMENTS

| | | |
|---|---|---|
| 4,415,210 | 11/1983 | Belart et al. . |
| 4,641,895 | 2/1987 | Belart et al. . |
| 4,718,737 | 1/1988 | Bach et al. ...................... 303/110 X |
| 4,754,605 | 7/1988 | Seibert et al. . |
| 4,758,054 | 7/1988 | Brown ............................ 303/110 X |
| 4,810,042 | 3/1989 | Kono et al. ...................... 303/92 |
| 4,848,853 | 7/1989 | Mizuno et al. ................... 303/114 X |
| 4,859,004 | 8/1989 | Nishii . |
| 4,874,207 | 10/1989 | Nishii et al. . |
| 4,887,869 | 12/1989 | Nishii et al. ..................... 303/114 |
| 4,895,416 | 1/1990 | Tozu et al. ....................... 303/92 |
| 4,902,075 | 2/1990 | Uno et al. ........................ 303/114 X |

FOREIGN PATENT DOCUMENTS

2106605A 9/1982 United Kingdom .
2173269A 10/1986 United Kingdom .
2186647A 8/1987 United Kingdom .

Primary Examiner—Douglas C. Butler
Attorney, Agent, or Firm—Burns, Doane, Swecker & Mathis

[57] ABSTRACT

A hydraulic braking system for an automotive vehicle is provided with a power source for generating a hydraulic power pressure, a master cylinder, a hydraulic booster for introducing the hydraulic power pressure and actuating the master cylinder in response to operation of a brake operating member, a wheel brake cylinder for braking a road wheel, a changeover valve, and anti-skid control device for actuating the changeover valve into a position where the wheel brake cylinder is communicated with the booster and regulating the hydraulic pressure in the wheel brake cylinder on the basis of the hydraulic power pressure in the booster when the road wheel is in a slip condition. The hydraulic braking system includes a failure detecting feature for producing a power pressure failure signal when the hydraulic power pressure in the booster is lower than the master cylinder pressure by at least a predetermined value, an anti-skid prohibiting device for prohibiting the anti-skid control operation in accordance with the failure signal, and a detection preventing feature for preventing the failure detecting features from producing the failure signal when the hydraulic power pressure in the booster exceeds a predetermined pressure which is lower than a limit pressure for boosting operation of the booster.

2 Claims, 7 Drawing Sheets

HYDRAULIC BRAKING SYSTEM FOR AN AUTOMOTIVE VEHICLE

BACKGROUND OF THE INVENTION

1. Field of the Invention

The present invention relates to a hydraulic braking system for use in an automotive vehicle, and more particularly to a hydraulic braking system having a hydraulic booster for actuating a master cylinder in response to operation of a brake operating member with a hydraulic power pressure supplied from a power source, wherein an anti-skid control operation is performed with the hydraulic power pressure applied to wheel brake cylinders.

2. Description of the Prior Art

In conventional service braking systems for an automotive vehicle, there are provided a plurality of hydraulic circuits connecting a master cylinder with wheel brake cylinders mounted on road wheels, so that when one of the hydraulic circuits is broken, braking operation is performed by the rest of the hydraulic circuits. In general, a tandem master cylinder is used in a conventional dual circuits system. In order to reduce the force required to operate a brake operating member, for example a depressing force applied on a brake pedal in braking operation, the hydraulic braking system is provided with a servo unit which is referred as a servo or a booster and which utilizes compressed air, intake manifold vacuum (for a vacuum booster), or hydraulic pressure (for a hydraulic booster) as a power source. The hydraulic booster is a booster which actuates the master cylinder by a hydraulic power pressure supplied from the power source in response to depression of the brake pedal.

As for the hydraulic braking system having the hydraulic booster, it has been proposed to employ the hydraulic booster as a pressure source for the anti-skid control device, whereby a hydraulic pressure in each of the wheel brake cylinders is controlled in response to a slip rate of each of the road wheels to thereby prevent the road wheels from locking. In this hydraulic braking system, the normal braking operation is carried out by a hydraulic braking pressure generated in a pressure chamber of the master cylinder (master cylinder pressure), whereas the anti-skid control operation is performed on the basis of the hydraulic power pressure. Accordingly, even if the hydraulic pressure in the wheel brake cylinder is increased or decreased in the anti-skid control operation, the brake operating member will not receive any reaction due to the change of the hydraulic pressure in the wheel brake cylinder.

However, in the case where the hydraulic power pressure applied to the wheel brake cylinder is insufficient, such as the case where a control valve provided in the hydraulic booster for controlling the hydraulic power pressure introduced thereinto from the power source is jammed, if the anti-skid control operation is performed, the braking force applied to the road wheels will be insufficient.

SUMMARY OF THE INVENTION

Accordingly, it is an object of the present invention to provide a hydraulic braking system for an automotive vehicle which prohibits an anti-skid control operation in the case where the insufficiency or failure of a hydraulic power pressure applied to a wheel brake cylinder is detected.

It is another object of the present invention to provide a hydraulic braking system for an automotive vehicle having means for detecting failure of a hydraulic power pressure on the basis of a difference between the hydraulic power pressure and a master cylinder pressure In accomplishing the above and other objects, a hydraulic braking system for an automotive vehicle according to the present invention comprises a power source for generating a hydraulic power pressure, a master cylinder for generating a hydraulic braking pressure in a pressure chamber defined therein in response to operation of a brake operating member, a hydraulic booster for introducing into a boost chamber defined therein the hydraulic power pressure from the power source and actuating the master cylinder by the hydraulic power pressure in the boost chamber in response to operation of the brake operating member, a wheel brake cylinder for braking a road wheel by a hydraulic pressure including the hydraulic braking pressure generated in the pressure chamber. The hydraulic braking system further comprises a changeover valve which is selectively placed in one of a first operating position for communicating the wheel brake cylinder with the pressure chamber and blocking the communication between the wheel brake cylinder and the boost chamber, and a second operating position for communicating the wheel brake cylinder with the boost chamber and blocking the communication between the wheel brake cylinder and the pressure chamber, and anti-skid control means for actuating the changeover valve into the second operating position and regulating the hydraulic pressure in the wheel brake cylinder by the hydraulic power pressure when the road wheel is in a slip condition. The hydraulic braking system includes failure detecting means for producing a power pressure failure signal when the hydraulic power pressure in the boost chamber is lower than the hydraulic braking pressure in the pressure chamber by at least a predetermined value, anti-skid prohibiting means for prohibiting anti-skid control operation of the anti-skid control means in accordance with the power pressure failure signal, and detection preventing means for preventing the failure detecting means from producing the power pressure failure signal when the hydraulic power pressure in the boost chamber exceeds a predetermined pressure which is lower than a limit pressure for boosting operation of the hydraulic booster.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENTS

Figure 1:
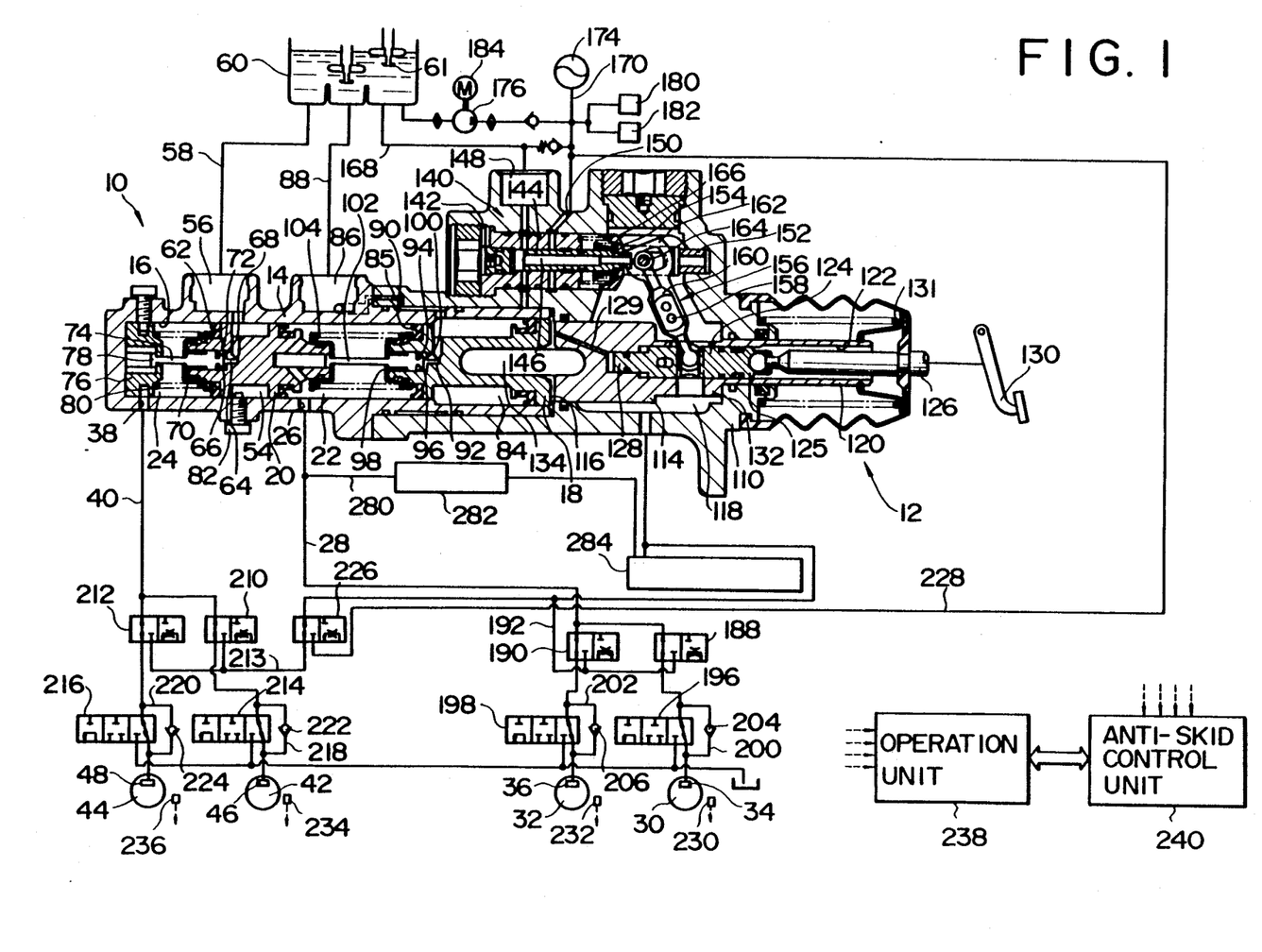
FIG. 1 is a schematic illustration of a hydraulic braking system according to an embodiment of the present invention.

Referring to FIG. 1, there is illustrated a hydraulic braking system of an embodiment of the present invention, which includes a master cylinder 10 and a hydraulic booster 12.

As for the master cylinder 10, a first master piston 18 and a second master piston are fluid-tightly and slidably disposed in a cylinder bore 16 defined in a housing 14, whereby a first pressure chamber 22 and a second pressure chamber 24 are defined in front of the master piston 18 and 20 respectively. A hydraulic braking pressure generated in the first pressure chamber 22 is applied to front wheel brake cylinders 34, 36 of left and right front road wheels 30, 32 through a port 26 and a passage 28, while a hydraulic braking pressure generated in the second pressure chamber 24 is applied to rear wheel brake cylinders 46, 48 of left and right rear road wheels 42, 44 through a port 38 and a passage 40. That is, the hydraulic braking system of the present invention is of a front-rear dual circuits system. Each of the left and right front road wheels 30, 32 and the left and right rear road wheels 42, 44 is independently controlled to prevent from locking in anti-skid operation, which will be described later.

An annular groove 54 is formed on the outer peripheral surface of the second master piston 20, and normally communicates with a reservoir 60 through a port 56 and a passage 58. The reservoir 60 is provided with a level warning switch 61 for detecting a reduction of a brake fluid in the reservoir and producing an output signal. A cup seal 62 is mounted on the second master piston 20, whereby the brake fluid is allowed to flow from the annular groove 54 to the second pressure chamber 24, while the brake fluid is prevented from flowing in the reverse direction. The second master piston 20 is further provided with a communication passage 64 which communicates the annular groove 54 and the second pressure chamber 24 each other, and in which there is disposed a check valve 72 comprising a valve member 66, a valve seat 68 and a spring 70. The valve member 66 has a forwardly projecting rod 74, which extends through a bottom of a cylindrical retainer 76, and a head portion 78 of the rod 74 is in engagement with the bottom of the cylindrical member 76. Between the retainer 76 and the second master piston 20, there is disposed a return spring 80 which biases the second master piston 20 toward its retractive end position where the second master piston 20 comes into contact with a bolt 82. In this condition, the valve member 66 is positioned slightly away from the valve seat 68 with the rod 74 engaged with the retainer 76, so that the check valve 72 is forcibly opened.

Similarly, an annular groove 84 is formed on the outer peripheral surface of the first master piston 18, and communicates with the reservoir 60 through a passage 85, a port 86 and a passage 88. Further, a cup seal 90 is mounted on the first master piston 18. Also, this piston 18 is provided with a communication passage 92 and a check valve 100 comprising a valve member 94, a valve seat 96 and a spring 98. A rod 102 extending from the valve member 94 is in engagement with the second master piston 20. The first master piston 18 is biased toward the retractive end position by a return spring 104 which is disposed between the first and second master pistons 18, 20, so that the check valve 100 is opened.

A housing 110 of the hydraulic booster 12 is provided integrally with the housing 14 of the master cylinder 10. A power piston 114 is fluid-tightly and slidably received in the housing 110 in concentric relationship with the first master piston 18, whereby the interior of the housing 110 is divided into a low-pressure chamber 116 communicating with the reservoir 60 at the front side of the power piston 114 and a boost chamber 118. A small-diameter portion 120 projects from the center of the back surface of the power piston 114 and fluid-tightly and slidably extends through an end wall of the housing 110 to be open to the atmosphere. A bore 122 is defined in the small-diameter portion 120 opening to the rear end surface thereof, and a reaction piston 124 is fluid-tightly and slidably received in the bore 122. The reaction piston 124 is formed in a stepped shape and is so structured that a hydraulic pressure in the boost chamber 118 is applied to a shoulder portion of a large-diameter portion 125 of the reaction piston 124 to provide a reaction force, which is proportional to a hydraulic pressure in the boost chamber 118, to an input rod 126. Further, a space between a small-diameter portion 128 of the reaction piston 124 and the bottom of the bore 122 is communicated with the low-pressure chamber 116 through a communication passage 129.

The input rod 126 is caulked by the reaction piston 124 at its tip end, connected at its rear end with a brake pedal 130 corresponding to a brake operating member, and biased toward the retractive direction by a return spring 131. The reaction piston 124 is so arranged that its movement relative to the power piston 114 is restricted. The return spring 131 also functions as a return spring to the power piston 114, and the retractive end position of the power piston 114 is defined by a shoulder portion 132. A force applied to the power piston 114 is transmitted to the first master piston 18 through a rod 134.

The hydraulic booster 12 is provided with a control valve 140, which includes a valve housing 142 received and secured in a bore formed in the housing 110 and includes a valve spool 144 fluid-tightly and slidably received in the valve housing 142. A communication hole 146 is formed in the valve spool 144. In the normal position shown in FIG. 1, the valve spool 144 permits a low-pressure port 148 to communicate with the boost chamber 118 through the communication hole 146 and closes a high-pressure port 150. When the valve spool 144 is advanced (moved to the left in FIG. 1) by a certain distance from the normal position, both the low-pressure port 148 and the high-pressure port 150 are closed. When the valve spool 144 is further advanced, the low-pressure port 148 is closed and the high-pressure port 150 is communicated with the boost chamber 118.

The above movement of the valve spool 144 is resulted from the advance movement of the reaction piston 124 relative to the power piston 114. A drive member 152 is connected to the valve spool 144 through a spring 154 and engaged with the power piston 114 and the reaction piston 124 through a link mechanism 156. The link mechanism 156 is provided with a first link 160 and a second link 162 which are pivotally connected to each other by a pin 158. One end of the first link 160 is pivotally mounted on a pin 164 which is secured to the housing 110, and the other end is engaged with the reaction piston 124. On the other hand, one end of the second link 162 is pivotally engaged with the drive member 152, and the other end is engaged with the small-diameter portion 120 of the power piston 114. Accordingly, if the reaction piston 124 is advanced relative to the power piston 114, the relative movement of the reaction piston 124 is converted into the advancement of the valve spool 144 by means of the link mechanism 156, so that the control valve 140 is changed over as noted above. A spring 166 is provided to bias the drive member 152 and the valve spool 144 toward the retractive direction. The hydraulic booster 12 is so arranged that the hydraulic power pressure in the boost chamber 118 comes to be slightly higher than the hydraulic braking pressure generated in each of the first and second pressure chamber 22, 24 (master cylinder pressure).

The control valve 140 is connected to the reservoir 60 through the low-pressure port 148 and a passage 168, and also connected to an accumulator 174 through the high-pressure port 150 and a passage 170. The brake fluid in the reservoir 60 is pumped out by a pump 176 and then stored in the accumulator 174 to be supplied to the hydraulic booster 12. Further, a hydraulic pressure control switch 180 and a low-pressure warning switch 182 are disposed in the passage 170. The operation of a pump motor 184 is controlled in accordance with the output by the hydraulic pressure control switch 180, so that the brake fluid within a certain hydraulic pressure range is always stored in the accumulator 174. The low-pressure warning switch 182 is so arranged to generate a warning signal, when it detects that the hydraulic pressure in the accumulator 174 is reduced to such an extent that the hydraulic booster 12 is unable to perform its boosting function.

Next will be described a device corresponding to the anti-skid control means according to the present invention. The anti-skid control in the hydraulic braking system of the present embodiment is executed by using the accumulator 174 connected to the hydraulic booster 12 as a hydraulic pressure source. That is, the passage 28 for connecting the first pressure chamber 22 to the left and right front road wheels 30, 32 is provided with two solenoid operated changeover valves 188, 190. These changeover valves 188, 190 are connected to the power pressure chamber 118 through a passage 192. The solenoid of each of the changeover valves 188, 190 is deenergized in the normal braking operation to be placed in a first operating position for communicating the front wheel brake cylinders 34, 36 with the first pressure chamber 22, and blocking the communication between these wheel brake cylinders 34, 36 and the boost chamber 118. On the other hand, when the solenoid is energized in the anti-skid control operation, each of the changeover valves 188, 190 are placed in a second operating position for communicating the front wheel cylinders 34, 36 with the boost chamber 118 and blocking the communication between these wheel brake cylinders 34, 36 and the first pressure chamber 22.

Also, solenoid operated pressure control valves (hereinafter simply referred to as control valves) 196, 198 are provided between the changeover valves 188, 190 and the front wheel brake cylinders 34, 36 respectively. Each of the control valves 196, 198 is a directional control valve having three operating positions. In the normal braking operation, the control valves 196, 198 are respectively placed in the positions shown in FIG. 1 for communicating the front wheel brake cylinders 34, 36 with the first pressure chamber 22. On the other hand, in the anti-skid control operation, the control valves 196, 198 are placed respectively in one of the three operating positions for providing the following conditions. That is, the pressure increasing condition shown in FIG. 1 in which the front wheel brake cylinders 34, 36 are communicated with the power pressure chamber 118 to permit a hydraulic pressure in the wheel brake cylinders 34, 36 (wheel cylinder pressure) to be increased, the pressure decreasing condition in which the wheel brake cylinders 34, 36 are communicated with the reservoir 60 to permit the wheel cylinder pressure to be decreased, and the holding condition in which the wheel brake cylinders 34, 36 are not communicated with either the boost chamber 118 or the reservoir 60 to hold the wheel cylinder pressure constant. There are disposed bypass passages 200, 202 for bypassing the control valves 196, 198, respectively. The bypass passages 200, 202 are provided respectively with check valves 204, 206 which permit the flow of brake fluid from the wheel brake cylinders 34, 36 to the first pressure chamber 22, and block the flow in the reverse direction, whereby the brake fluid is rapidly returned to the first pressure chamber 22 when the wheel brake cylinders 34, 36 are released from braking.

The circuit for the left and right rear road wheels 42, 43 is similarly constituted as noted above and provided with two solenoid operated changeover valves 210, 212, a passage 213, two solenoid operated pressure control valves 214, 216, two bypass passages 218, 220 and two check valves 222, 224. Also, another solenoid operated changeover valve 226 is provided on a portion of the passage connecting the changeover valves 210, 212 to the boost chamber 118. The solenoid operated changeover valve 226 is connected to the accumulator 174 through a passage 228. This changeover valve 226 permits the changeover valves 210, 212 to communicate with the boost chamber 118 in the case where the solenoid is deenergized, and also permits the changeover valves 210, 212 to communicate with the accumulator 174 in the case where the solenoid is energized. The hydraulic power pressure is directly supplied from the accumulator 174 to the rear wheel brake cylinders 46, 48 without being regulated by the control valve 140.

A rotational speed of each of the left and right front road wheels 30, 32 and left and right rear road wheels 42, 44 is detected respectively by the corresponding one of revolution sensors 230, 232, 234 and 236 from which each detected signal is fed to an operation unit 238 for operating a slip rate and etc.. In this operation unit 238, operated are the rotational speed of each road wheel, the deceleration, the vehicle body speed, the slip rate or the like. On the basis of the result of operation in the operation unit 238, an anti-skid control unit 240 actuates the changeover valves 188, 190, 210 and 212, and places each of the control valves 196, 198, 214 and 216 into the appropriate position to hold the slip rate of each of the road wheels within a proper range. Thus, the control valves 196, 198, 214 and 216, the reservoir 60, the accumulator 174, the anti-skid control unit 240 or the like constitute the anti-skid control means.

Figure 3:
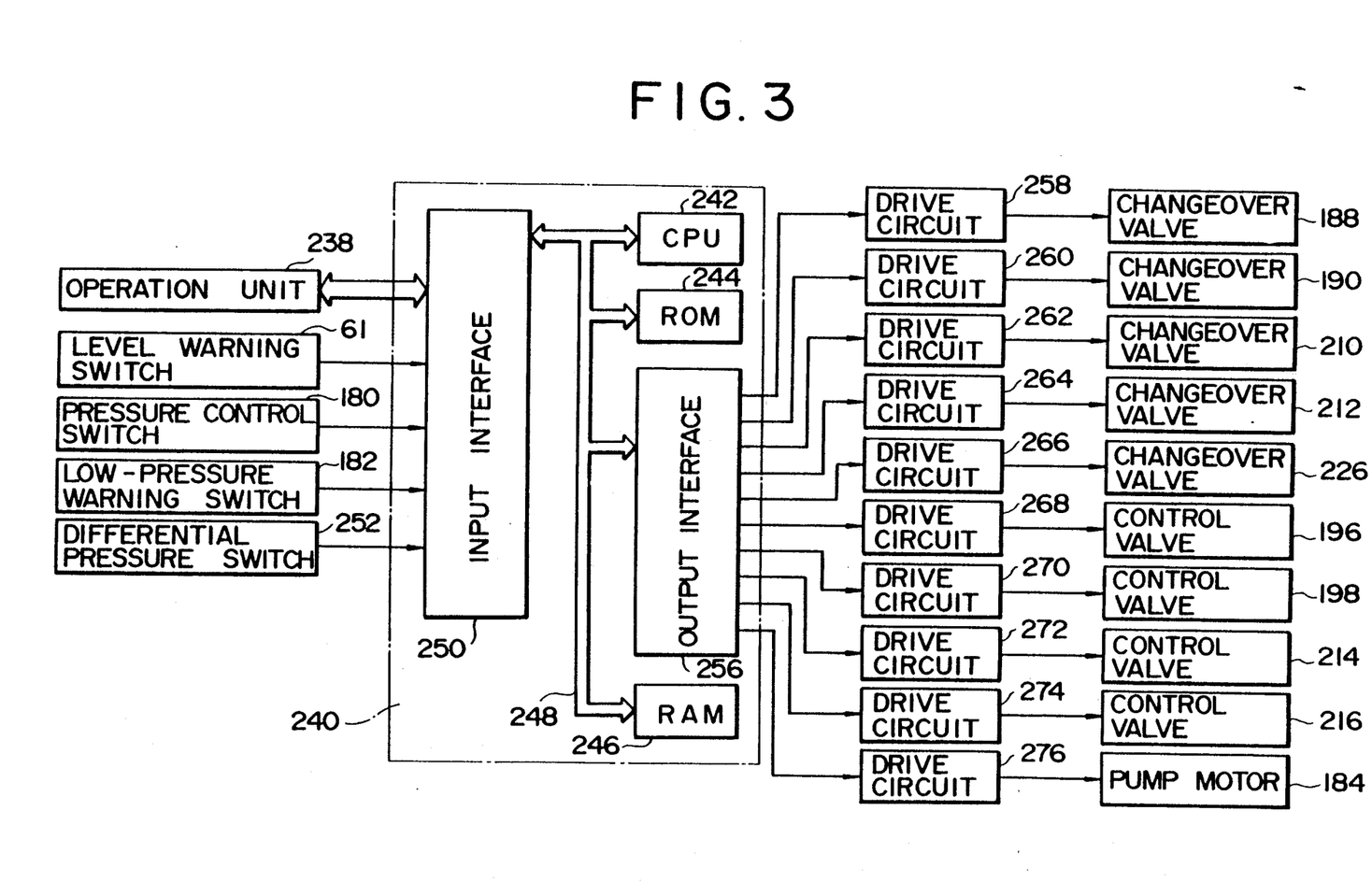
FIG. 3 is a block diagram showing a control unit for controlling the hydraulic braking system shown in FIG. 1.

As shown in FIG. 3, the anti-skid control unit 240 comprises a microcomputer provided with CPU 242, ROM 244, RAM 246 and a bus 248 interconnecting therebetween. An input interface 250 is connected to the bus 248. The operation unit 238, the level warning switch 61, the hydraulic pressure control switch 180, the low-pressure warning switch 182, a later described differential pressure switch 252 or the like are connected to the input interface 250. An output interface 256 is also connected to the bus 248. The changeover valves 188, 190, 212 and 226, the control valves 196, 198, 214 and 216, the pump motor 184 and the like are connected to the output interface 256 through drive circuits 258, 260, 262, 264, 266, 268, 270, 272, 274 and 276. Various programs necessary for the anti-skid control operation are stored in the ROM 244.

Figure 2:
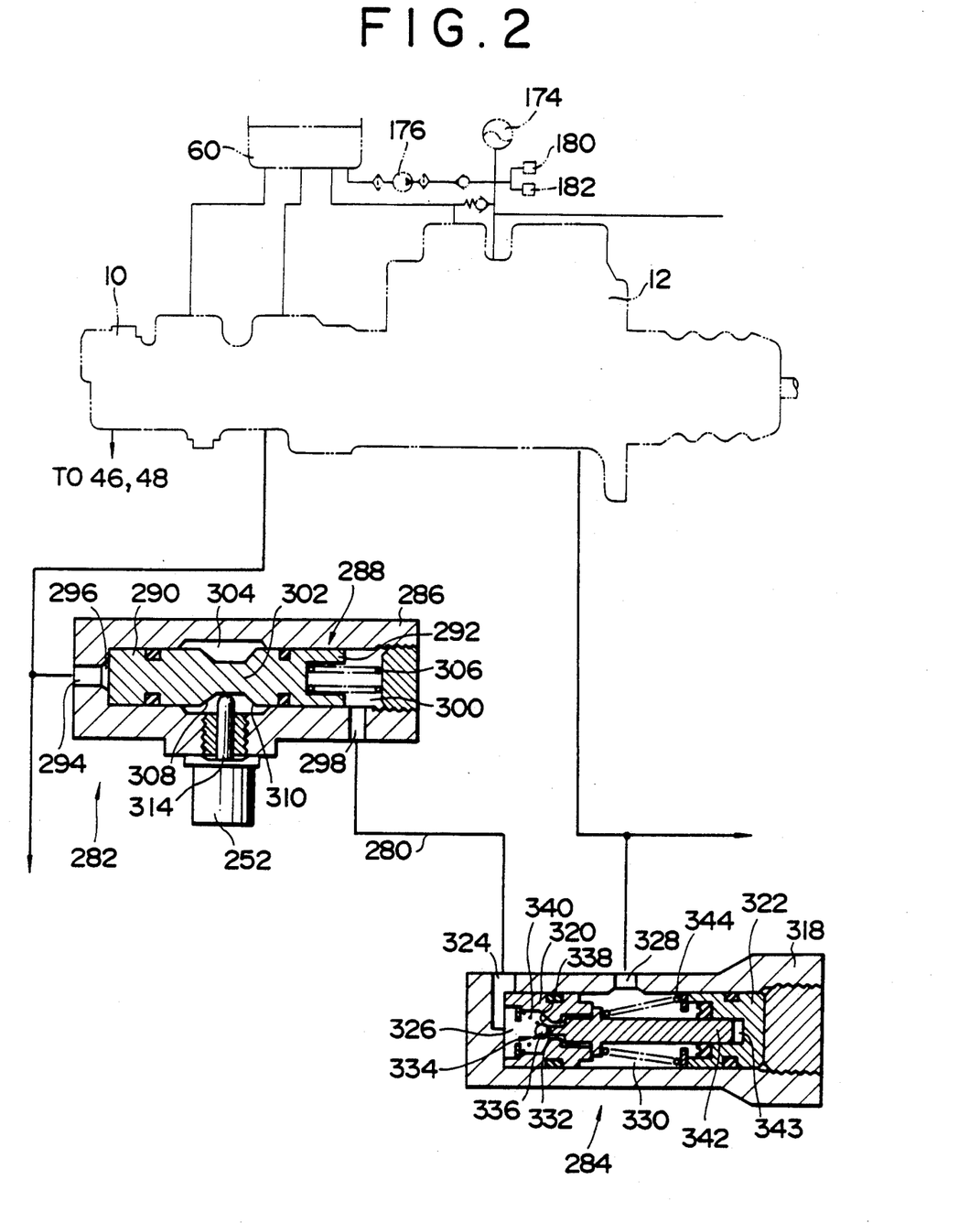
FIG. 2 is a sectional view showing a power pressure failure detecting device and a cut-off valve of the hydraulic braking system according to the embodiment shown in FIG. 1.

In the hydraulic braking system of the present embodiment, the first pressure chamber 22 is connected to the boost chamber 118 through a passage 280 in which a power pressure failure detecting device 282 and a cut-off valve 284 are provided. Referring to FIG. 2, a differential pressure piston 288 is fluid-tightly and slidably received in a housing 286 of the power pressure failure detecting device 282. The differential pressure piston 288 has a small-diameter portion 302 at its longitudinal intermediate portion, and large-diameter portions 290, 292 at its opposite ends which are received in the housing 286. Thereby, in the housing 286, there are formed a first chamber 296 which is defined by the large-diameter portion 290 and the housing 286 and which is communicated with the first pressure chamber 22 through a port 294, a second chamber 300 which is defined by the large-diameter portion 292 and the housing 286 and which is communicated with the boost chamber 118 through the port 298 and the cut-off valve 284, and an annular chamber 304 which is defined by the small-diameter portion 302 and the housing 286. A spring 306 is disposed in the second chamber 300 to bias the piston 288 toward the first chamber 296. The spring 306 normally holds the piston 288 at its inoperative position where the piston 288 is in contact with the bottom of the housing 286. Further, tapered portions 308, 310 are formed between the small-diameter portion 302 and the large-diameter portion 290, and between the small-diameter portion 302 and the large-diameter portion 292, respectively.

The differential pressure switch 252 is mounted on a portion of the housing 286 which confronts the small-diameter portion 302 when the piston 288 is positioned in its inoperative condition. A plunger 314 of the differential pressure switch 252 is slidably fitted to a peripheral wall of the housing 286, and biased by a spring (not shown) so as to project into the annular chamber 304 and abut on the piston 288. When the hydraulic pressure in the second chamber 300 is decreased lower than the hydraulic pressure in the first chamber 296 by a predetermined value or more to move the piston 288 toward the second chamber 300, the plunger 314 is pressed by the tapered portion 308. Thereby, the differential pressure switch 252 feeds a power pressure failure signal to the input interface 250 of the anti-skid control unit 240 which prohibits the anti-skid control operation. In the case where the power pressure failure signal is fed in the normal braking operation, the anti-skid control unit 240 does not perform thereafter the anti-skid control operation even if the slip of the road wheel exceeds a predetermined amount to initiate the operation. On the other hand, in the case where the power pressure failure signal is fed in the anti-skid control operation, the anti-skid control unit 240 stops the anti-skid control operation. In the present embodiment as described above, the power pressure failure detecting device 282 corresponds to the failure detecting means according to the present invention, and a part of the anti-skid control unit 240, which is arranged to prohibit the anti-skid control operation in accordance with the power pressure failure signal, corresponds to the anti-skid prohibiting means according to the present invention.

In a housing 318 of the cut-off valve 284, a first block 320 and a second block 322 are fixed, and there are defined a valve chamber 326 communicating with the second chamber 300 of the power pressure failure detecting device 282 through a port 324, a piston chamber 330 communicating with the boost chamber 118 through a port 328, and a passage 332 communicating between the valve chamber 326 and the piston chamber 330. In the valve chamber 326, disposed is a check valve 334 which is provided with a valve member 336, and a spring 340 for biasing the valve member 336 so as to be seated on a valve seat 338 formed on one end of the passage 332. When the valve member 336 is seated on the valve seat 338, the flow of brake fluid from the valve chamber 326, i.e., that from the second chamber 300 of the device 282 toward the boost chamber 118 is blocked. The check valve 334 is opened by the piston 342 which is fluid-tightly and slidably fitted into the second block 322 in the piston chamber 330. The tip end of the piston 342 is inserted through the passage 332, while the rear end thereof is faced to an atmospheric pressure chamber 343. Further, the valve member 336 is biased by the spring 344 to be placed away from the valve seat 338. When the hydraulic power pressure applied to the piston 342 is less than a biasing force of the spring 344, the check valve 334 is held to be in an open condition. On the other hand, when the hydraulic power pressure is increased to such an extent that the hydraulic power pressure applied to the piston 342 overcomes the biasing force of the spring 344, the piston 342 is retreated to close the check valve 334, so that the flow of brake fluid from the second chamber 300 to the piston chamber 330 is blocked. The hydraulic power pressure necessary for the check valve 334 to be closed is set to a value lower than the hydraulic pressure necessary for the low-pressure warning switch 182 to produce the warning signal, that is, a value lower than a limit pressure of the hydraulic power pressure for the boosting operation. Thus, when the hydraulic power pressure is higher than the pressure necessary for the check valve to be closed, the brake fluid does not flow out of the second chamber 300 to block the movement of the differential pressure piston 288, so that the power pressure failure signal is prevented from being output. In the present embodiment, therefore, the cut-off valve 284 corresponds to the detection preventing means according to the present invention.

In the hydraulic braking system constituted as noted above, the solenoid of each of the changeover valves 188, 190, 210, 212 and 226, and the control valves 196, 198, 214 and 216 is deenergized in the normal braking operation, so that the valves are in the condition as shown in FIG. 1 where the wheel brake cylinders 34, 36, 46 and 48 are communicated with the pressure chambers 22, 24. Accordingly, if the brake pedal 130 is depressed, the input rod 126 is advanced and then the valve spool 144 is advanced, so that the communication between the boost chamber 118 and the low-pressure port 148 is blocked, while the boost chamber 118 is communicated with the high-pressure port 150 to introduce the brake fluid into the boost chamber 118. Thereby, the power piston 114 is actuated to advance the first master piston 18, so that the brake fluid in the first pressure chamber 22 is supplied to the front wheel brake cylinders 34, 36. Further, with the first master piston 18 advanced, the second master piston 20 is advanced, so that the brake fluid in the second pressure chamber 24 is supplied to the rear wheel brake cylinders 46, 48.

When the slip rate of the road wheel is increased to initiate the anti-skid control operation, each of the changeover valves 188, 190, 210 and 212 is changed over into the condition that the wheel brake cylinders 34, 36, 46 and 48 are communicated with the boost chamber 118. Thus, the anti-skid control operation is effected by the accumulator 174 which functions as the hydraulic pressure source, so that even if the wheel cylinder pressure is increased or decreased, no reaction is applied to the brake pedal 130.

In the normal braking operation or the anti-skid control operation carried out as noted above, when the accumulator 174, the pump 176, the control valve 140 or the like are operated normally, and the hydraulic power pressure is increased to reach a predetermined pressure in response to depression of the brake pedal 130, the check valve 334 is closed. Thus, the outflow of the hydraulic power pressure from the second chamber 300 is blocked, and the operation of the power pressure failure detecting device 282 is prohibited. Accordingly, even if the brake pedal 130 is further depressed after the hydraulic power pressure reaches the limit pressure for boosting operation of the hydraulic booster 12, and if the hydraulic braking pressure generated in the first pressure chamber 22 is increased higher than the limit pressure for the boosting operation by a predetermined value or more, the differential pressure piston 288 is not moved, so that the power pressure failure detecting device 282 is prevented from producing the power pressure failure signal by mistake although the hydraulic power pressure is obtained normally, and that the anti-skid control operation is prevented from being prohibited. The cut-off valve 284 is provided for preventing the power pressure failure signal from being produced by mistake although the hydraulic power pressure is obtained normally. Therefore, the pressure necessary for the check valve 334 to be closed is set to be lower than the pressure necessary for the low-pressure warning switch 182 to produce the warning signal.

Supposing that the check valve 334 is arranged to be closed with the hydraulic power pressure higher than the hydraulic pressure necessary to produce the warning signal, when the hydraulic power pressure reaches the limit pressure for the boosting operation, which is higher than the hydraulic power pressure necessary to produce the warning signal, and produces the differential pressure between the hydraulic power pressure and the master cylinder pressure, the power pressure failure signal is produced to prohibit the anti-skid control operation performed on the basis of the hydraulic power pressure, even if the hydraulic power pressure is obtained normally. By closing the check valve 334 with the hydraulic power pressure lower than the hydraulic pressure for producing the warning signal, the power pressure failure signal is produced only when any trouble takes place, so that the power pressure failure signal is free from being produced by mistake.

In the case where the hydraulic pressure in the accumulator 174 does not increase due to the troubles of the components such as the accumulator 174, the pump 176 or the like, which are placed on the side of the accumulator 174 from the control valve 140, the low-pressure warning switch 182 produces the warning signal, and the anti-skid control unit 240 prohibits the anti-skid control operation in both circuits for the front and rear road wheels. That is, the changeover valves 188, 190, 210 and 212 are held to be placed in its first operating position where the wheel brake cylinders 34, 36, 46 and 48 are communicated with the first and second pressure chambers 22, 24. If the anti-skid control operation is being performed, the changeover valves 188, 190, 210 and 212 are changed over from the second operating position into the first operating position. Since the anti-skid control operation is prohibited in both circuits for the front and rear road wheels, it is avoided that the anti-skid control operation is performed although the hydraulic power pressure is not obtained. In starting of the anti-skid control operation, the wheel cylinder pressure is once decreased, and thereafter increased properly. However, if the hydraulic power pressure is not supplied, the wheel cylinder pressure is decreased without being increased, so that the insufficiency of a braking force will occur. This occurrence is avoided by prohibiting the anti-skid control operation.

Further, in the case where the hydraulic power pressure does not increase due to the troubles of the components placed on the wheel brake cylinder side from the control valve 140, such as jam in the control valve 140 for example, although the accumulator 174 or the pump 176 is operated normally, the cut-off valve 284 is not closed. Therefore, when the master cylinder pressure is increased higher than the hydraulic power pressure by the predetermined value or more, the differential pressure piston 288 is moved toward the second chamber 300, and the differential pressure switch 252 produces the power pressure failure signal. Further, even if the hydraulic power pressure starts to be decreased after the cut-off valve 284 is once closed, the cut-off valve 284 is opened as long as the hydraulic power pressure is decreased down to the predetermined pressure, so that the power pressure failure detecting means 282 is permitted to produce the power pressure failure signal.

In this case, since only the power pressure failure signal is produced without the warning signal produced, it is detected that the jam or the like occurs although the accumulator 174, the pump 176 or the like are operated normally. The power pressure failure detecting device 282 and the cut-off valve 284 operate either in the case where the accumulator 174 or the like gets out of order, and in the case where the control valve 140 is jammed, and produce the power pressure failure signal in response to decrease of the hydraulic power pressure In other words, although the occurrence of any trouble may be detected only by the power pressure failure detecting device 282, the kind of trouble is unknown. Therefore, the low-pressure warning switch 182 is also provided, so that it is detected that the jam or the like in the control valve 140 causes the output of the power pressure failure signal in view of the fact that the warning signal is not produced.

Then, in this case, the anti-skid control operation is performed in the circuit for the rear road wheels on the basis of the hydraulic power pressure in the accumulator 174. The anti-skid control unit 240 actuates the changeover valves 210, 212 and 226 when the slip of the road wheel exceeds the predetermined amount, so that the hydraulic power pressure in the accumulator 174 is directly supplied to the rear wheel brake cylinders 46, 48 and the anti-skid control operation is performed. On the other hand, the anti-skid control unit 240 does not actuate the changeover valves 188, 190, so that the anti-skid control operation is not performed in the circuit for the front road wheels. Further, if the anti-skid control operation is being performed, the anti-skid control unit 240 actuates the changeover valves 188, 190 into the first operating position, and also actuates the changeover valve 226 to communicate the rear wheel brake cylinders 46, 48 with the accumulator 174. The anti-skid control operation in the circuit for the front road wheels is prohibited, whereas the anti-skid control operation in the circuit for the rear road wheels is performed, so that the insufficiency of the braking force is avoided, and the driving stability of a vehicle is ensured.

In the present embodiment, since the hydraulic power pressure in the hydraulic booster 12 is set to be slightly higher than the master cylinder pressure, the differential pressure piston 288 is moved until the cut-off valve 284 is closed when the braking operation is made, so that the power pressure failure signal is not produced. Further, in the case where the troubles of the accumulator 174 and the pump 176 may be detected by means other than the measurement of the hydraulic pressure, the hydraulic pressure necessary for the check valve 334 to be closed may be properly set within the range less than the lowest hydraulic pressure in the hydraulic pressure range obtainable in the accumulator 174 so as to prevent the differential pressure switch 252 from producing the power pressure failure signal in the hydraulic pressure higher than the limit pressure for the boosting operation of the hydraulic booster 12.

Figure 4:
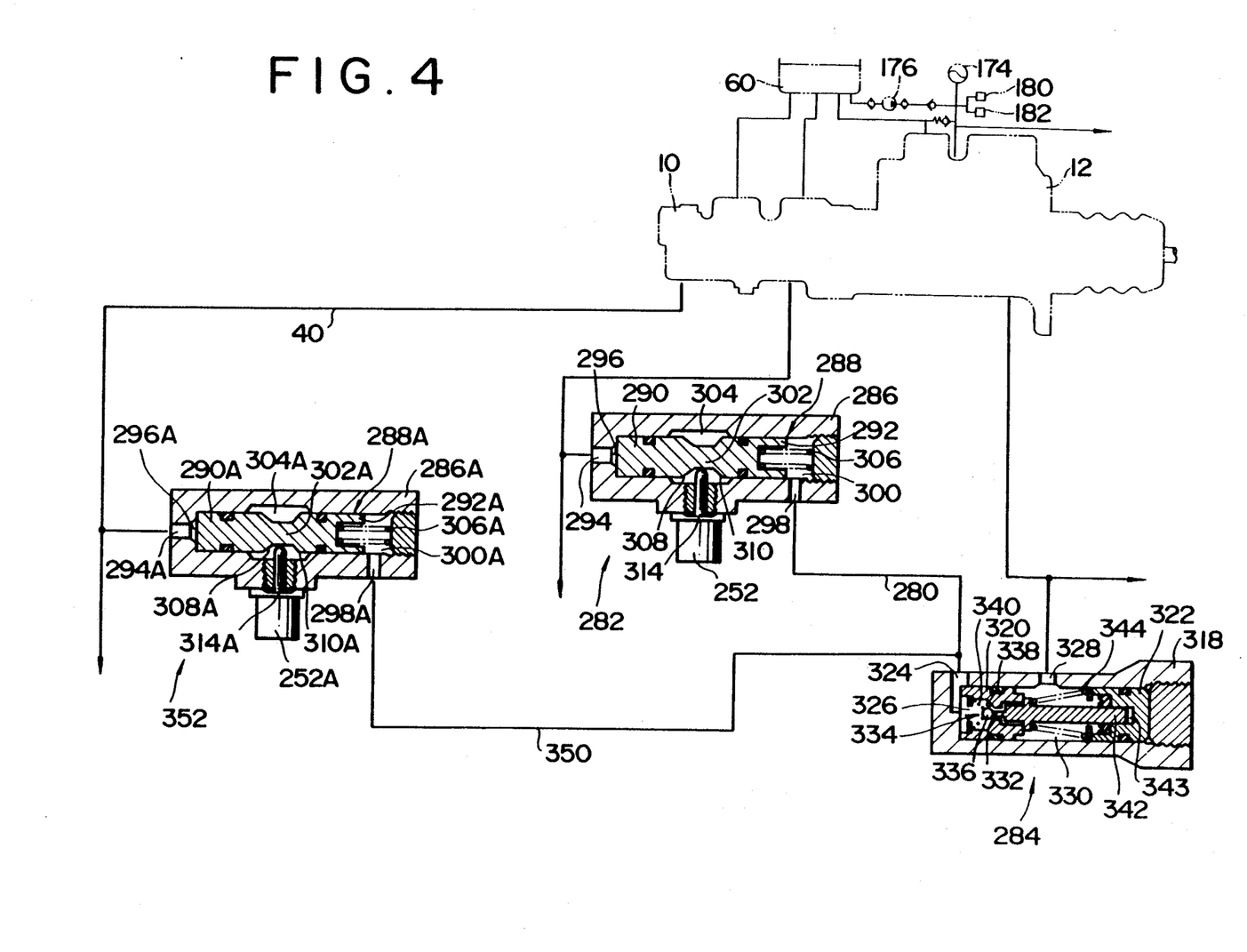
FIG. 4 is a sectional view showing a power pressure failure detecting device and a cut-off valve of a hydraulic braking system according to another embodiment of the present invention.

In the hydraulic braking system in accordance with the above embodiment, the hydraulic power pressure in the hydraulic booster 12 is compared only with the master cylinder pressure in the circuit for the front road wheels 30, 32, while it may be compared also with the master cylinder pressure in the circuit for the rear road wheels 42, 44. In the latter case, as shown in FIG. 4, the passage 40 for supplying the master cylinder pressure to the left and light rear road wheels 42, 44 is connected to a portion between the power pressure failure detecting device 282 and the cut-off valve 284 through a passage 350, in which another power pressure failure detecting device 352 is disposed. This device 352 is substantially same as the power pressure failure detecting device 282 and its components are designated by adding A to the end of the reference numerals of the corresponding components of the failure detecting device 282, so that the detailed description thereof will be omitted.

In the present embodiment, supposing that the hydraulic power pressure in the hydraulic booster 12 is decreased due to the jam or the like in the control valve 140 in the case where not only both the circuits for the front and rear road wheels are in the normal condition, but also the accumulator 174 and the pump 176 are in the normal condition, the power pressure failure signals are output from both two power pressure failure detecting devices 282, 352, so that the anti-skid control operation in the circuit for the front road wheels is prohibited in response to the power pressure failure signals. Namely, the changeover valves 188, 190 are not changed over. On the other hand, in the circuit for the rear road wheels, the changeover valves 210, 212 and 226 are changed over as for the rear road wheels, so that the anti-skid control operation is performed on the basis of the hydraulic power pressure in the accumulator 174.

If the jam or the like occurs in the control valve 140 in the case where the circuit for the front road wheels gets out of order, and where the circuit for the rear road wheels is in the normal condition, the power pressure failure signal is output from the power pressure failure detecting device 352 disposed in the circuit for the rear road wheels. In this case, the anti-skid control operation in the circuit for the front road wheels is prohibited, whereas the anti-skid control operation in the circuit for the rear road wheels is performed on the basis of the hydraulic power pressure in the accumulator 174.

Further, if the jam or the like occurs in the control valve 140 in the case where the circuit for the front road wheels is in the normal condition, and where the circuit for the rear road wheels gets out of order, the power pressure failure signal is output from the power pressure failure detecting device 282 provided in the circuit for the front road wheels. In this case, since the hydraulic power pressure is not obtained from the hydraulic booster 12, and besides the circuit for the rear road wheels gets out of order, not only the anti-skid control operation in the circuit for the front road wheels is prohibited, but also that in the circuit for the rear road wheels is prohibited to prevent the leakage of the brake fluid out of the accumulator 174.

As described above, since the present embodiment includes two power pressure failure detecting devices, the decrease of the hydraulic power pressure may be detected even if either of the circuits for the front and rear road wheels gets out of order, and the leakage of the brake fluid out of the accumulator 174 may be prevented when the circuit for the rear road wheels gets out of order.

Figure 5:
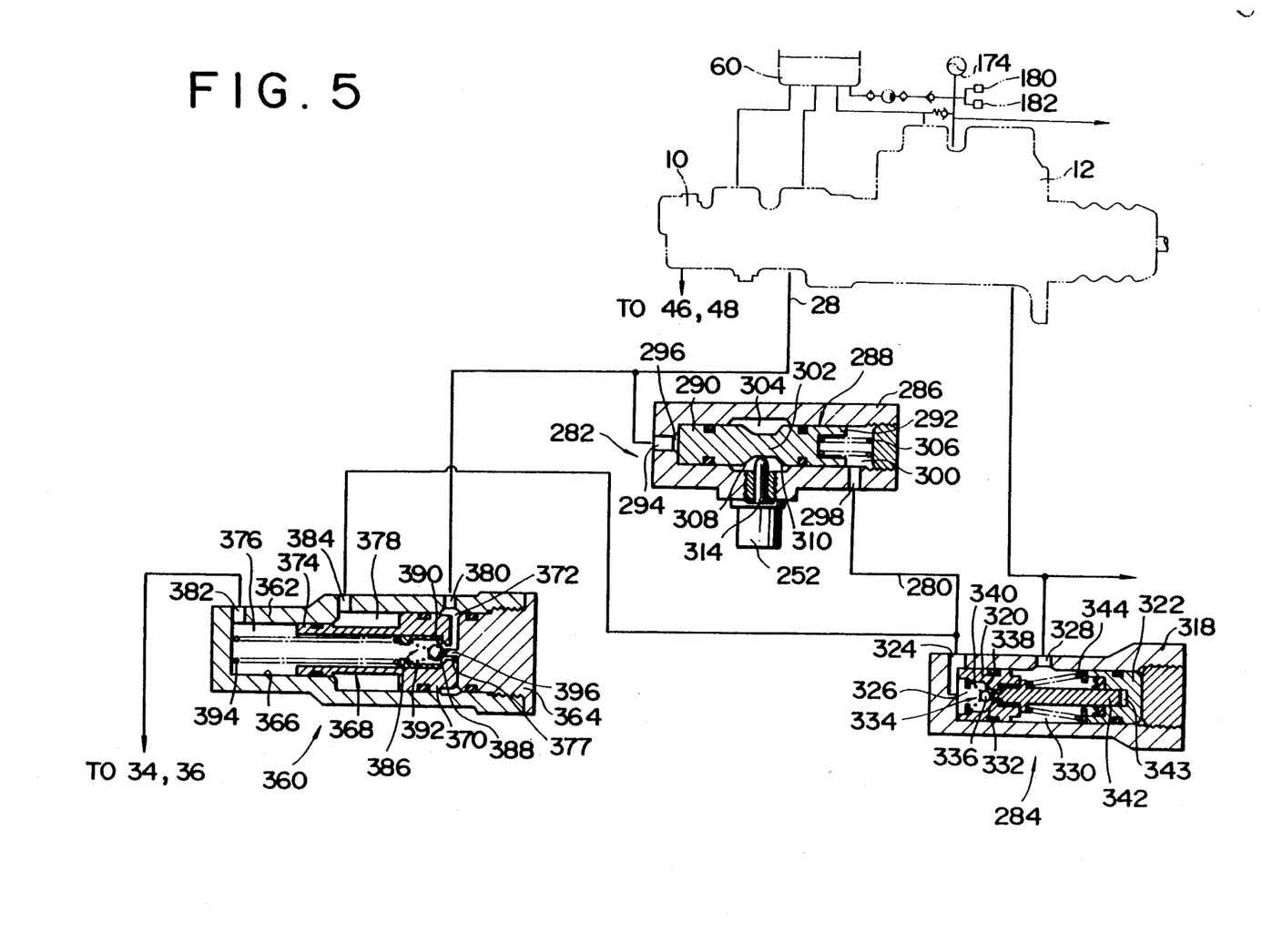
FIG. 5 is a sectional view showing a power pressure failure detecting device, a cut-off valve and an auxiliary cylinder of a hydraulic braking system according to a further embodiment of the present invention.

FIG. 5 shows a further embodiment according to the present invention. This embodiment is provided with the power pressure failure detecting device 282 which is operated in accordance with a difference between the hydraulic braking pressure in the first pressure chamber 22 and the hydraulic power pressure in the boost chamber 118, and the cut-off valve 284, as those embodiments shown in FIG. 1 to 3, and further provided with an auxiliary cylinder 360 in the circuit for the front road wheels, whereby the hydraulic braking pressure in the first pressure chamber 22 is increased and supplied to the front wheel brake cylinders 34, 36 in the braking operation in the case where the sufficient hydraulic power pressure is not obtained The auxiliary cylinder 360 is disposed in a portion of the passage 28 connecting the first pressure chamber 22 to the front wheel brake cylinders 34, 36, and includes a housing 362 of a cylinder with bottom. The opening of the housing 362 is closed by a plug 364, and a stepped cylinder bore 366 is defined in the housing 362. A stepped piston 368 is fluid-tightly and slidably received in the cylinder bore 366. Thus, in the housing 362, there are formed a first chamber 372 on the side of a large-diameter portion 370 of the stepped piston 368, a second chamber 376 on the side of a small-diameter portion 374 of the stepped piston 368, a passage 377 communicating between the first chamber 372 and the second chamber 376, and a third chamber 378 defined by the small-diameter portion 374 and a peripheral wall of the housing 362. The first chamber 372 is communicated with the first pressure chamber 22 through a port 380, and the second chamber 376 is communicated with the front wheel brake cylinders 34, 36 through a port 382. Also, the third chamber 378 is communicated with a portion between the power pressure failure detecting device 282 and the cut-off valve 284 through a port 384. Further, a cut-off valve 386 for blocking the communication between the first chamber 372 and the second chamber 376 is disposed in the stepped piston 368. The cut-off valve 386 is provided with a valve member 388 and a spring 392 for biasing the valve member 388 so as to be seated on a valve seat 390 which is provided on the stepped piston 368. The stepped piston 368 is biased toward the first chamber 372 by a spring 394. Under the condition that the stepped piston 368 is in contact with the plug 364, the valve member 388 is placed away from the valve seat 390 by a projection formed on the plug 364, so that the brake fluid is permitted to flow from the first pressure chamber 22 into the front wheel brake cylinders 34, 36.

In the present embodiment, if the braking operation is carried out under the condition that the hydraulic power pressure is normally obtained from the hydraulic booster 12, the hydraulic pressure in the third chamber 378 increases in accordance with the increase of the hydraulic power pressure, so that the outflow of brake fluid from the third chamber 378 is blocked after the cut-off valve 284 is closed. Accordingly, since the stepped piston 368 is held to be in contact with the plug 364, and the cut-off valve 386 is held to be opened, the hydraulic braking pressure generated in the first pressure chamber 22 is supplied to the front wheel brake cylinders 34, 36 as it is. On the contrary, if the braking operation is carried out under the condition that the hydraulic power pressure cannot be obtained from the hydraulic booster 12 due to the troubles of the accumulator 174, the control valve 140 or the like, the hydraulic pressure in the third chamber 378 is not increased, and the stepped piston 368 is moved toward the second chamber 376, so that the valve member 388 is seated on the valve seat 390 to block the communication between the first pressure chamber 22 and the front wheel brake cylinders 34, 36. Thereafter, when the hydraulic braking pressure in the first pressure chamber 22 is increased, the stepped piston 368 is moved with the cut-off valve 386 held to be closed, so that hydraulic pressure in the second chamber 376 is increased in accordance with the ratio of the diameter of the large-diameter portion 370 to that of the small-diameter portion 374 of the stepped piston 368, and supplied to the front wheel brake cylinders 34, 36. Consequently, the left and right front road wheels 30, 32 are easily braked without the boosting operation of the hydraulic booster 12.

In the aforementioned embodiments, in order to prevent the power pressure failure signal from being output by mistake, the brake fluid from the second chamber 300 of the power pressure failure detecting device 282 is blocked not to flow out therefrom. However, as shown in FIG. 6, a cutoff valve 400 may be disposed between the passage 28 for supplying the master cylinder pressure to the front wheel brake cylinders 34, 36 and the first chamber 296 of the device 282, whereby the transmission of the master cylinder pressure to the first chamber 296 is blocked, and erroneous output of the power pressure failure signal is prevented.

Figure 6:
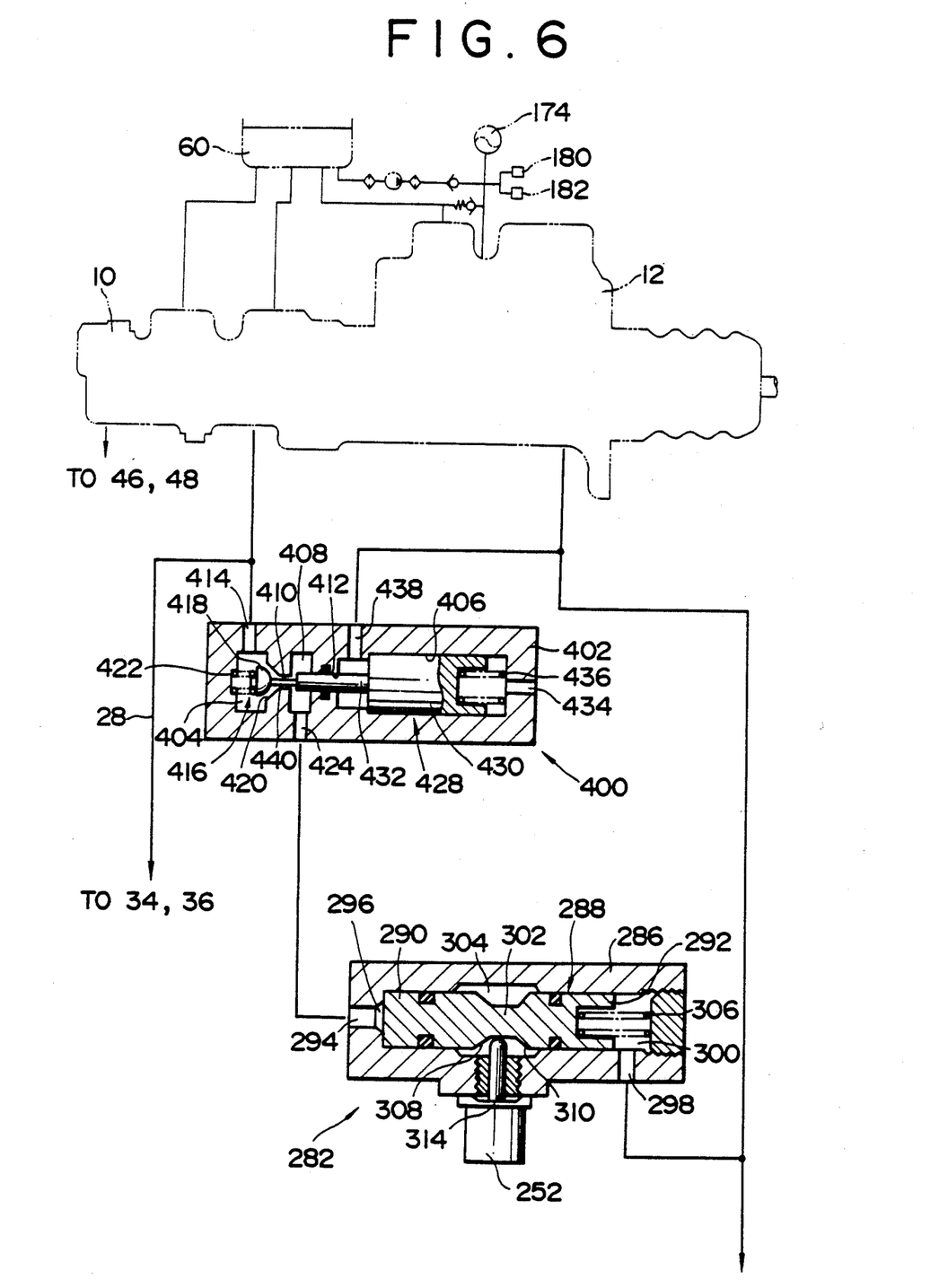
FIG. 6 is a sectional view showing a further embodiment of detection preventing means together with the power pressure failure detecting device.

Referring to FIG. 6, in a housing 402 of the cut-off valve 400, there are formed a valve chamber 404, a piston chamber 406, a pressure chamber 408 between the valve chamber 404 and the piston chamber 406, and through holes 410, 412 communicating between the pressure chamber 408 and the valve chamber 404, and between the former and the piston chamber 406 respectively. The valve chamber 404 is connected to the passage 28 through a port 414 and provided with a valve mechanism 416. The valve mechanism 416 is provided with a valve member 418 and a spring 422 for biasing the valve member 418 so as to be seated on a valve seat 420 provided on an open end of the through hole 410. The pressure chamber 408 is connected to the first chamber 296 of the power pressure failure detecting device 282 through a port 424. In the case where the valve mechanism 416 is closed, the transmission of the hydraulic braking pressure from the first pressure chamber 22 of the master cylinder 10 to the first chamber 296 of the device 282 is blocked.

A valve opening piston 428 is fluid-tightly and slidably received in the piston chamber 406. The valve opening piston 428 is formed in stepped configuration and is fitted to the piston chamber 406 at a large-diameter portion 430 of the piston 428. A space defined between the large-diameter portion 430 in the piston chamber 406 and an end wall of the housing 402 is communicated with the atmosphere through a port 434, and a spring 436 is disposed in this space to bias the valve opening piston 428 toward the valve chamber 404. Further, a space defined in the piston chamber 406 on the side of the small-diameter portion 432 is communicated with the boost chamber 118 of the hydraulic booster 12 through a port 438, and the tip of the small-diameter portion 432 of the stepped piston 428 is in contact with a projection 440 of the valve member 418.

As for the cut-off valve 400, in the case where the braking operation is not carried out and where the hydraulic power pressure is not produced in the hydraulic booster 12, the valve opening piston 428 is held to be biased toward the valve chamber 404 by the spring 436, and the valve 416 is opened to permit the master cylinder pressure to supply from the first pressure chamber 22 to the first chamber 296 of the device 282. When the brake pedal 130 is depressed and the hydraulic power pressure exceeds a predetermined pressure, the valve opening piston 428 is retreated against the biasing force of the spring 436 to close the valve mechanism 416. The above predetermined pressure is set to a value slightly lower than the pressure necessary for the low-pressure warning switch 182 to produce the warning signal In the case where the hydraulic power pressure is normally obtained from the hydraulic booster 12, the valve mechanism 416 is closed before the hydraulic power pressure reaches the limit pressure for the boosting operation, so that the transmission of the master cylinder pressure to the first chamber 296 is blocked. Therefore, the differential pressure piston 288 is not moved, and the power pressure failure signal is not produced. After the hydraulic power pressure reaches the limit pressure for the boosting operation, the power pressure failure signal is not produced by mistake even if the master cylinder pressure is further increased. Also, in the case where the sufficient hydraulic power pressure is not obtained from the hydraulic booster 12 due to the troubles of the accumulator 174, the control valve 140 or the like, the valve opening piston 428 holds its advanced position, and the valve mechanism 416 is opened to thereby produce the power pressure failure signal.

Figure 7:
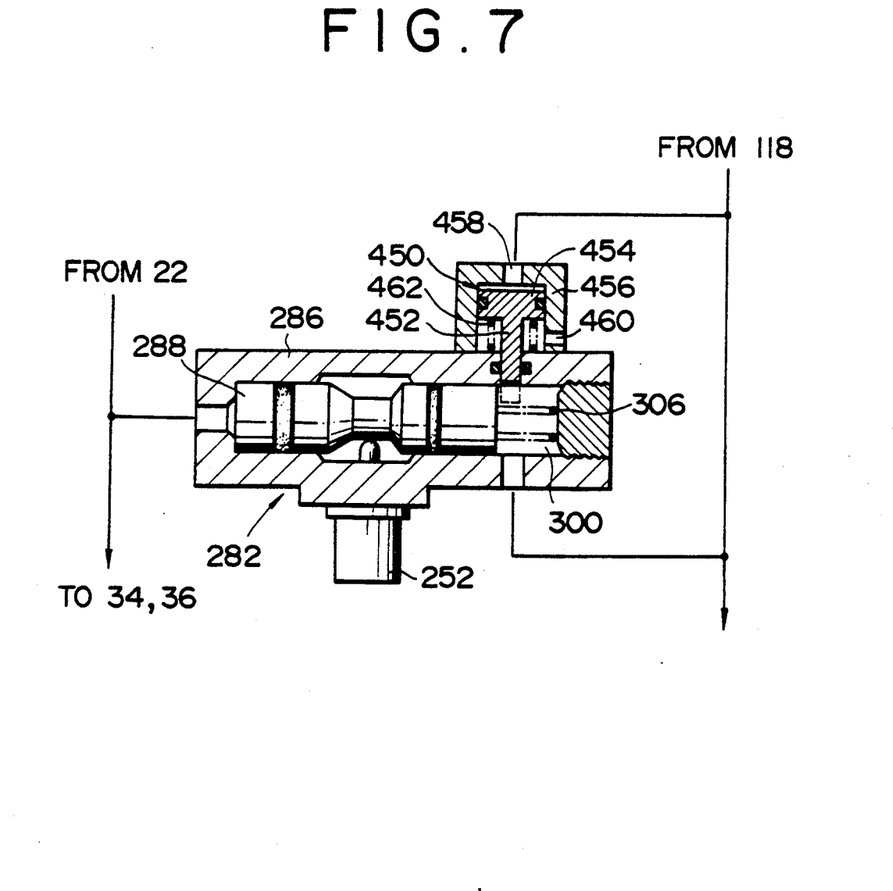
FIG. 7 is a sectional view showing a still further embodiment of the detection preventing means.

FIG. 7 shows a still further embodiment according to the present invention. In this embodiment, the movement of the differential pressure piston 288 is mechanically blocked to prevent the power pressure failure signal from being output. On a peripheral wall of the housing 286 of the power pressure failure detecting device 282, a movement blocking piston 450 which corresponds to the blocking member according to the present invention, is mounted, in the direction perpendicular to the moving direction of the differential pressure piston 288, at a position where the piston 450 does not abut on the differential pressure piston 288 and extends into the second chamber 300 when the differential pressure piston 282 is placed at its inoperative position. The movement blocking piston 450 is formed in the stepped configuration, and is fluid-tightly and slidably fitted to the housing 286 at a small-diameter portion 452 of the piston 450. A large-diameter portion 454 of the piston 450 is fluid-tightly and slidably fitted in a cylindrical case 456 fixed to the housing 286. Thereby, a space in the case 456 is divided into two chambers. One chamber defined between a closed end of the case 456 and the large-diameter portion 454 is communicated with the boost chamber 118 through a port 458, and the other chamber is communicated with the atmosphere through a port 460. Further, the movement blocking piston 450 is biased by a spring 462 so as to be seated on the closed end of the case 456.

In the case where the brake pedal 130 is not depressed, and where the hydraulic power pressure is not generated in the hydraulic booster 12, the movement blocking piston 450 is in such a condition that the small-diameter portion 452 of the piston 450 is retracted into the peripheral wall of the housing 286. When the hydraulic power pressure exceeds a predetermined pressure to overcome the biasing force of the spring 456, the movement blocking piston 450 is moved toward the second chamber 300, and the small-diameter portion 452 extends into the second chamber 300 to block the movement of the differential pressure piston 288. The above predetermined pressure is set to a value slightly lower than the pressure necessary for the low-pressure warning switch 182 to produce the warning signal. Accordingly, in the case where the hydraulic power pressure is normally obtained from the hydraulic booster 12 without any troubles of the accumulator 174, the pump 176, the control valve 140 or the like, even if the master cylinder pressure is further increased after the hydraulic power pressure reaches the limit pressure for the boosting operation and then a differential pressure is produced therebetween, the differential pressure piston 288 is not moved, so that the power pressure failure signal is not produced. In the present embodiment, therefore, the movement blocking piston 450 or the like constitutes the detection preventing means. In the case where the sufficient hydraulic power pressure is not obtained from the hydraulic booster 12 due to the troubles of the accumulator 174, the control valve 140 or the like, the movement blocking piston 450 is retracted from the interior of the second chamber 300 to allow the movement of the differential pressure piston 288, so that the power pressure failure signal is produced.

Figure 8:
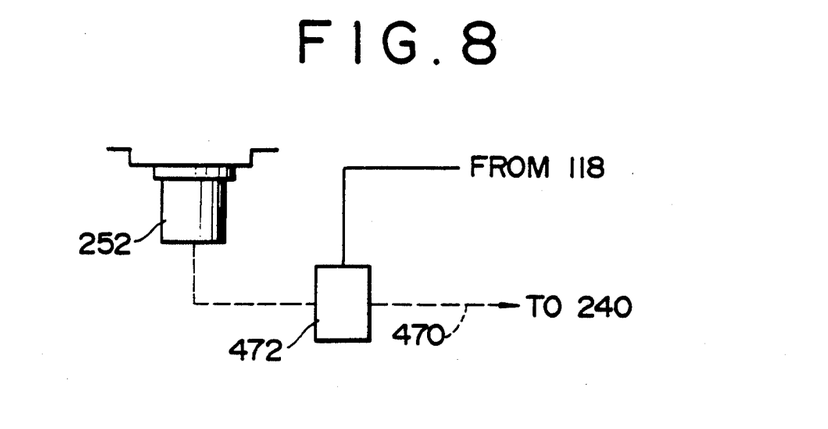
FIG. 8 is a schematic view showing a yet further embodiment of the detection preventing means.

As shown in FIG. 8, the power pressure failure signal may be prevented from being output by a pressure switch 472 provided on a signal line 470 for feeding a signal produced by the differential pressure switch 252 to the anti-skid control unit 240. The pressure switch 472 permits the signal line 470 to be on during a period of time when the hydraulic power pressure in the boost chamber 118 is less than the predetermined pressure, whereas the pressure switch 472 shuts off the signal line 470 when the hydraulic power pressure is increased in excess of the predetermined pressure. Therefore, even if the differential pressure is produced between the hydraulic power pressure and the master cylinder pressure after the hydraulic power pressure reaches the limit pressure for the boosting operation, the power pressure failure signal is not fed to the anti-skid control unit 240. In the case where the sufficient hydraulic power pressure is not obtained, the power pressure failure signal is fed to the unit 240. In the present embodiment, the pressure switch 472 or the like constitutes the detection preventing means.

In the respective embodiments as noted above, while the anti-skid control operation for both of two circuits for the front and rear road wheels is performed on the basis of the hydraulic power pressure in the boost chamber 118, the anti-skid control operation only for one circuit may be performed on the basis of the hydraulic power pressure, whereas the anti-skid control operation for the other circuit may be performed on the basis of the master cylinder pressure. Further, the present invention is not limited to the hydraulic braking system of the front and rear dual circuits system, but it may be applied to a hydraulic braking system of a diagonal circuits system, and that of a single circuit system.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A hydraulic braking system for an automotive vehicle comprising:
a power source for generating a hydraulic power pressure;
a master cylinder for generating a hydraulic braking pressure in a pressure chamber defined therein in response to operation of a brake operating member;
a hydraulic booster for introducing into a boost chamber defined therein said hydraulic power pressure from said power source and actuating said master cylinder by said hydraulic power pressure in said boost chamber in response to operation of said brake operating member;
a plurality of wheel brake cylinders for braking respective road wheels, said wheel brake cylinders divided into a first group of wheel brake cylinders for front road wheels communicating with said master cylinder through a first hydraulic circuit and a second group of wheel brake cylinders for rear road wheels communicating with said master cylinder through a second hydraulic circuit;
changeover valves disposed between said master cylinder and each of said wheel brake cylinders in said first and second hydraulic circuits, and selectively placed in one of a first operating position for communicating said wheel brake cylinders with said pressure chamber and blocking the communication between said wheel brake cylinders and said boost chamber, and a second operation position for communicating said wheel brake cylinders with said boost chamber and blocking the communication between said wheel brake cylinders and said pressure chamber;

anti-skid control means for actuating said changeover valves into said second operating position and regulating hydraulic pressures in said wheel brake cylinders on the basis of said hydraulic power pressure when each of said road wheels is in a slip condition;

failure detecting means for producing a power pressure failure signal when said hydraulic power pressure in said boost chamber is lower than said hydraulic braking pressure in said pressure chamber by at least a predetermined value;

anti-skid prohibiting means for prohibiting anti-skid control operation of said anti-skid control means in accordance with said power pressure failure signal;

detection preventing means for preventing said failure detecting means for producing said power pressure failure signal when said hydraulic power pressure in said boost chamber exceeds a predetermined pressure which is lower than a limit pressure for boosting operation of said hydraulic booster; and an auxiliary cylinder disposed in said first hydraulic circuit for applying said hydraulic braking pressure from said master cylinder directly to said first group of wheel brake cylinders in an inoperative condition of said auxiliary cylinder and increasing said hydraulic braking pressure applied to said first group of wheel brake cylinders in response to operation of said brake operating member in an operative condition of said auxiliary cylinder, said operative condition being made when said hydraulic power pressure in said hydraulic booster is lower than said hydraulic braking pressure by a predetermined difference.

2. A hydraulic braking system for an automotive vehicle comprising:

a power source for generating a hydraulic power pressure;

a master cylinder for generating a hydraulic braking pressure in a pressure chamber defined therein in response to operation of a brake operating member;

a hydraulic booster for introducing into a boost chamber defined therein said hydraulic power pressure from said power source and actuating said master cylinder by said hydraulic power pressure in said boost chamber in response to operation of said brake operating member;

a plurality of wheel brake cylinders for braking respective road wheels, said wheel brake cylinders divided into a first group of wheel brake cylinders for front road wheels communicating with said master cylinder through a first hydraulic circuit and a second group of wheel brake cylinders for rear road wheels communicating with said master cylinder through a second hydraulic circuit;

changeover valves disposed between said master cylinder and each of said wheel brake cylinders in said first and second hydraulic circuits, and selectively placed in one of a first operating position for communicating said wheel brake cylinders with said pressure chamber and blocking the communication between said wheel brake cylinders and said boost chamber, and a second operation position for communicating said wheel brake cylinders with said boost chamber and blocking the communication between said wheel brake cylinders and said pressure chamber;

anti-skid control means for actuating said changeover valves into said second operating position and regulating hydraulic pressures in said wheel brake cylinders on the basis of said hydraulic power pressure when each of said road wheels is in a slip condition;

failure detecting means for producing a power pressure failure signal when said hydraulic power pressure in said boost chamber is lower than said hydraulic braking pressure in said pressure chamber by at least a predetermined value;

anti-skid prohibiting means for prohibiting anti-skid control operation of said anti-skid control means in accordance with said power pressure failure signal; and detection preventing means for preventing said failure detecting means for producing said power pressure failure signal when said hydraulic power pressure in said boost chamber exceeds a predetermined pressure which is lower than a limit pressure for boosting operation of said hydraulic booster; and an auxiliary cylinder disposed in said first hydraulic circuit for applying said hydraulic braking pressure from said master cylinder directly to said first group of wheel brake cylinders in an inoperative condition of said auxiliary cylinder and increasing said hydraulic braking pressure applied to said first group of wheel brake cylinders in response to operation of said brake operating member in an operative condition of said auxiliary cylinder, said operative condition being made when said hydraulic power pressure in said hydraulic booster is lower than said hydraulic braking pressure by a predetermined difference, said auxiliary cylinder comprising a housing having a cylinder bore defined therein and a piston axially slidably disposed within said cylinder bore, said piston forming at one end thereof within said cylinder bore a first chamber communicating with said master cylinder, and forming at the other end thereof within said cylinder bore a second chamber communicating with said first group of wheel brake cylinders and a third chamber communicating with said hydraulic booster, said piston having a valve mechanism disposed therein for normally allowing the communication between said first chamber and said second chamber, and blocking the communication therebetween when a hydraulic pressure in said third chamber is lower than a hydraulic pressure in said first chamber by said predetermined difference.

* * * * *